United States Patent
Ito et al.

(10) Patent No.: US 10,778,053 B2
(45) Date of Patent: Sep. 15, 2020

(54) ROTOR STRUCTURE OF ROTARY ELECTRIC MACHINE

(71) Applicant: Honda Motor Co., Ltd., Tokyo (JP)

(72) Inventors: Yuta Ito, Saitama (JP); Takuya Yoshizawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 15/678,126

(22) Filed: Aug. 16, 2017

(65) Prior Publication Data

US 2018/0062463 A1    Mar. 1, 2018

(30) Foreign Application Priority Data

Aug. 25, 2016 (JP) ................... 2016-164963

(51) Int. Cl.
| | | |
|---|---|---|
| *H02K 1/27* | (2006.01) | |
| *H02K 9/19* | (2006.01) | |
| *H02K 1/32* | (2006.01) | |
| *H02K 1/24* | (2006.01) | |
| *H02K 3/34* | (2006.01) | |
| *H02K 7/08* | (2006.01) | |
| *H02K 9/22* | (2006.01) | |

(52) U.S. Cl.
CPC ............... *H02K 1/276* (2013.01); *H02K 1/24* (2013.01); *H02K 1/2766* (2013.01); *H02K 1/32* (2013.01); *H02K 3/34* (2013.01); *H02K 7/083* (2013.01); *H02K 7/085* (2013.01); *H02K 9/19* (2013.01); *H02K 9/22* (2013.01); *H02K 2201/06* (2013.01); *H02K 2213/03* (2013.01)

(58) Field of Classification Search
None
See application file for complete search history.

(56) References Cited

U.S. PATENT DOCUMENTS

2009/0261667 A1* 10/2009 Matsubara ........... H02K 1/2766
310/54

FOREIGN PATENT DOCUMENTS

| CN | 102197572 | 9/2011 |
|---|---|---|
| JP | 2009-284603 | 12/2009 |
| JP | 2010-239734 | 10/2010 |
| JP | 2011254571 | 12/2011 |

(Continued)

OTHER PUBLICATIONS

"Office Action of China Counterpart Application," dated Mar. 11, 2019, with English translation thereof, p. 1-p. 13.

(Continued)

*Primary Examiner* — Nguyen Tran
(74) *Attorney, Agent, or Firm* — JCIPRNET

(57) ABSTRACT

To provide a rotor of a rotary electric machine having higher cooling performance than that of the related art. In a rotor structure of a rotary electric machine, on a surface on the side of a rotor core (20) of a first end surface plate (30), a plurality of grooves (33) that radially extend are provided, and a first annular groove (32) that annularly extends along a circumference of an insertion hole (31) into which a shaft (10) is inserted is provided. In addition, the first annular groove (32) is connected to radially inside end portions of the grooves (33) and a refrigerant supply hole portion (12) of the rotor core (20), and a depth of the first annular groove (32) is set to be larger than a depth of the grooves (33).

13 Claims, 11 Drawing Sheets

(56) References Cited

FOREIGN PATENT DOCUMENTS

JP 2013115848 6/2013

OTHER PUBLICATIONS

"Office Action of Japan Counterpart Application," dated Nov. 28, 2017, with partial English translation, p. 1-p. 6, in which the listed references were cited.
Office Action of China Counterpart Application, with English translation thereof, dated Sep. 12, 2019, pp. 1-6.

* cited by examiner

ROTOR STRUCTURE OF ROTARY ELECTRIC MACHINE

CROSS-REFERENCE TO RELATED APPLICATION

This application claims the priority benefit of Japan application serial no. 2016-164963, filed on Aug. 25, 2016. The entirety of the above-mentioned patent application is hereby incorporated by reference herein and made a part of this specification.

BACKGROUND OF THE INVENTION

Field of the Invention

The present invention relates to a rotor structure of a rotary electric machine.

Description of Related Art

In the related art, a rotary electric machine in which a groove that radially extends is formed on an inner surface of an end plate (end surface plate) that is arranged to face an axial end surface of a rotor core, and a refrigerant flow path is provided between the end plate and the axial end surface of the rotor core has been disclosed (for example, refer to Patent Document 1). In the rotary electric machine, a refrigerant that flows through a flow path in a rotor shaft deviates to the outer peripheral side of the flow path due to a centrifugal force generated by rotation of the rotor, and flows into a groove (refrigerant flow path) of the above end plate from a plurality of branch flow paths formed on the outer periphery of the rotor shaft. Then, the refrigerant that has flowed into the groove is supplied into a through hole of the above rotor core and thus the rotor core is cooled.

PRIOR ART DOCUMENT

Patent Documents

[Patent Document 1] Japanese Patent Publication No. 2009-284603

SUMMARY OF THE INVENTION

However, in the rotary electric machine described in Patent Document 1, due to variation in assembling accuracy and processing accuracy during production, positions of a branch oil passage and a groove in a circumferential direction may vary. When the positions in the circumferential direction vary, since a desired amount of refrigerant is not supplied to the rotor core, cooling performance varies and cooling performance deteriorates.

In addition, in the rotary electric machine described in Patent Document 1, the refrigerant may not be supplied from the refrigerant flow path between the end plate and the axial end surface of the rotor core into the through hole, and may flow in a radially outward direction from between the end plate and the rotor core. In this case, since a flow rate of the refrigerant that flows into the through hole is reduced, cooling performance deteriorates.

In view of the above-described circumstances, the present invention provides a rotor of a rotary electric machine having higher cooling performance than that of the related art.

In order to address the above problems, the present invention provides a rotor structure (for example, a rotor structure 1 to be described below) of a rotary electric machine including a rotating shaft portion (for example, a shaft 10 to be described below) including a refrigerant flow path (for example, a cooling flow path 11 to be described below) through which a refrigerant (for example, a refrigerant 100 to be described below) flows, a cylindrical rotor core (for example, a rotor core 20 to be described below) that is pivotally supported on the rotating shaft portion and holds a plurality of magnets (for example, a magnet 90 to be described below), and an end surface plate (for example, a first end surface plate 30 to be described below) which is arranged to face an axial end surface of the rotor core and in which an insertion hole (for example, an insertion hole 31 to be described below) into which the rotating shaft portion is inserted is formed. The rotating shaft portion includes a refrigerant supply hole portion (for example, a refrigerant supply hole portion 12 to be described below) through which a refrigerant is supplied between the rotor core and the end surface plate from the refrigerant flow path. The end surface plate includes a plurality of grooves (for example, a groove 33 to be described below) that are formed on an inner surface on the side of the rotor core and radially extend and a first annular groove (for example, a first annular groove 32 to be described below) which is formed to annularly extend in a circumference of the insertion hole on an inner surface on the side of the rotor core and is connected to a radially inside end portion of the groove and the refrigerant supply hole portion and which has a greater depth than the groove.

In the present invention, the plurality of grooves that radially extend are provided on a surface on the side of the rotor core of the end surface plate and the first annular groove that annularly extends along a circumference of the insertion hole into which the rotating shaft portion is inserted is provided. In addition, the first annular groove is connected to a radially inside end portion of the groove and the refrigerant supply hole portion of the rotor core, and a depth of the first annular groove is set to be larger than a depth of the groove.

Accordingly, since the refrigerant supply hole portion is connected to the first annular groove having an annular shape, even if positional deviation occurs in the circumferential direction due to variation in assembling accuracy and processing accuracy during production, a connection state of both is favorably maintained. As a result, it is possible to reduce variation in a supply amount of the refrigerant and it is possible to improve cooling performance. In addition, when a depth of the first annular groove is set to be larger, since the first annular groove can function as a refrigerant reservoir, it is possible to further reduce variation in a supply amount of a refrigerant and it is possible to further improve cooling performance.

Preferably, a depth (for example, a depth a to be described below) of a first step (for example, a first step 45 to be described below) formed in a portion in which the first annular groove and the groove are connected is set to be larger than a diameter (for example, a diameter b to be described below) of the refrigerant supply hole portion.

In the present invention, a depth of the first step formed in a portion in which the first annular groove and the groove are connected is set to be larger than a diameter of the refrigerant supply hole portion. Accordingly, since it is possible to efficiently supply a refrigerant to the rotor core while friction when the refrigerant flows is reduced, it is possible to further improve cooling performance.

Preferably, a plurality of grooves corresponding to a multiple of the number of pole pairs of the rotary electric machine are formed.

In the invention, grooves corresponding to a multiple of the number of pole pairs of the rotary electric machine are formed. Accordingly, since it is possible to uniformly supply a refrigerant to a plurality of magnet portions of the rotor core in which magnets are held, it is possible to further improve cooling performance.

Preferably, the rotor core includes a plurality of through holes (for example, a second through hole 26 to be described below) that are formed in a circumferential direction radially inside from the magnets and extend in an axial direction to pass through. The end surface plate includes a second annular groove (for example, a second annular groove 34 to be described below) which is formed to annularly extend radially outside from the groove on an inner surface on the side of the rotor core and is connected to a radially outside end portion of the groove. A radial position of a second step (for example, a second step 46 to be described below) formed at a radially outside end portion of the second annular groove is arranged between a radially outside end and a radially inside end of the through hole.

In the invention, a second annular groove that is connected to a radially outside end portion of the groove is provided and a radial position of a second step formed at a radially outside end portion of the second annular groove overlaps a radial position of the through hole of the rotor core. Accordingly, since it is possible to efficiently and reliably supply a refrigerant to the through hole of the rotor core, it is possible to efficiently cool the rotor core and it is possible to improve cooling performance.

Preferably, the second step is formed as a curved surface or an inclined surface that is positioned in a radially outward direction toward the rotor core.

In the invention, the second step at a radially outside end portion of the second annular groove is formed as a curved surface or an inclined surface that is positioned in a radially outward direction toward the rotor core. Accordingly, it is possible to prevent a refrigerant from flowing into a gap between the end surface plate and the rotor core in a radially outward direction while friction is reduced. That is, since it is possible to efficiently and reliably supply a refrigerant into the through hole of the rotor core, it is possible to further improve cooling performance.

Preferably, the rotating shaft portion includes a support (for example, a support 15 to be described below) that is formed in a flange shape at an axial end thereof and supports a circumference of the insertion hole on an axial outside surface of the end surface plate. The end surface plate includes a contact surface portion (for example, an inner contact surface portion 60 to be described below) which is formed between the plurality of grooves that are arranged between the first annular groove and the second annular groove in a circumferential direction and which is in contact with a radially inside end portion on the axial end surface of the rotor core.

In the invention, the support that supports a circumference of the insertion hole on the axial outside surface of the end surface plate is provided in a flange of the rotating shaft portion and a contact surface portion in contact with a radially inside end portion on the axial end surface of the rotor core is provided on the end surface plate. Accordingly, since the end surface plate can be supported while being sandwiched in the axial direction, it is possible to prevent deformation of the end surface plate when the rotor core is press-fitted.

Preferably, the plurality of through holes are arranged at equal intervals in the circumferential direction.

In the invention, the plurality of through holes formed in the rotor core are arranged at equal intervals in the circumferential direction. Accordingly, since it is possible to uniformly supply a refrigerant to the rotor core, it is possible to further improve cooling performance.

According to the present invention, it is possible to provide a rotor of a rotary electric machine having higher cooling performance than that of the related art.

DESCRIPTION OF THE EMBODIMENTS

Figure 1:
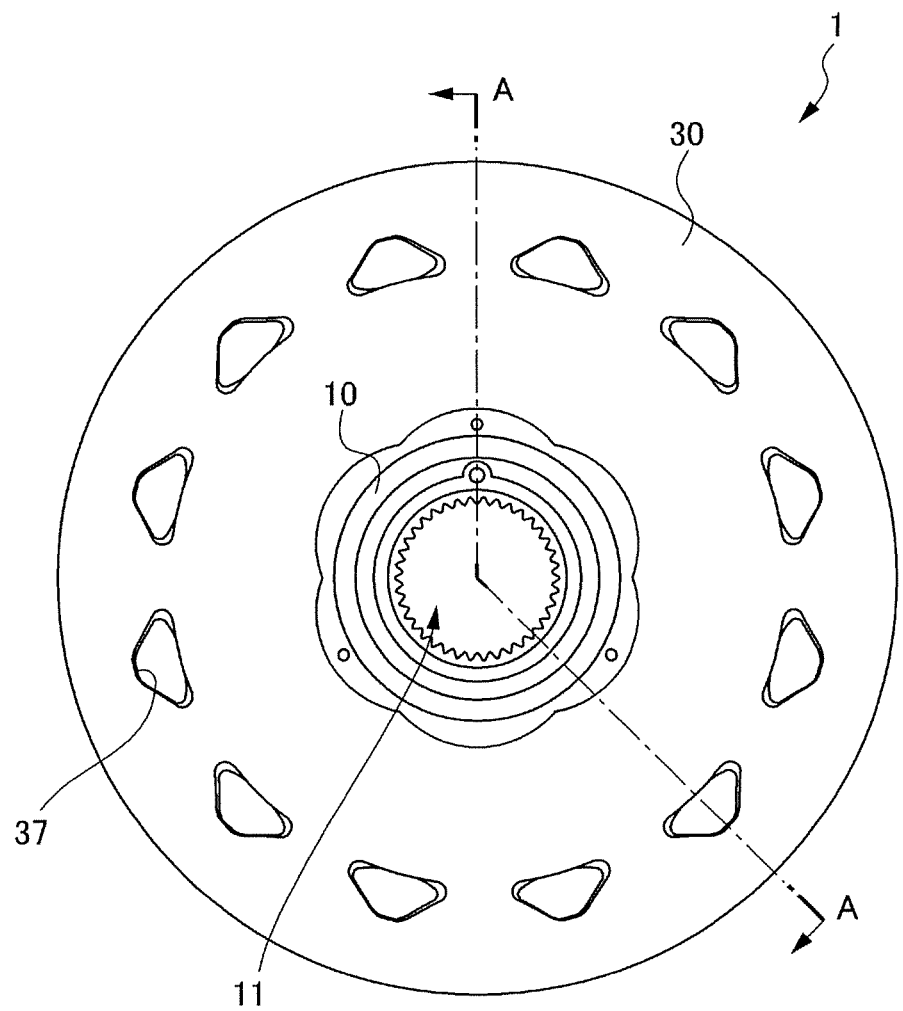
FIG. 1 is a diagram of a rotor structure of a rotary electric machine according to an embodiment of the present invention viewed from one side in an axial direction.
Figure 2:
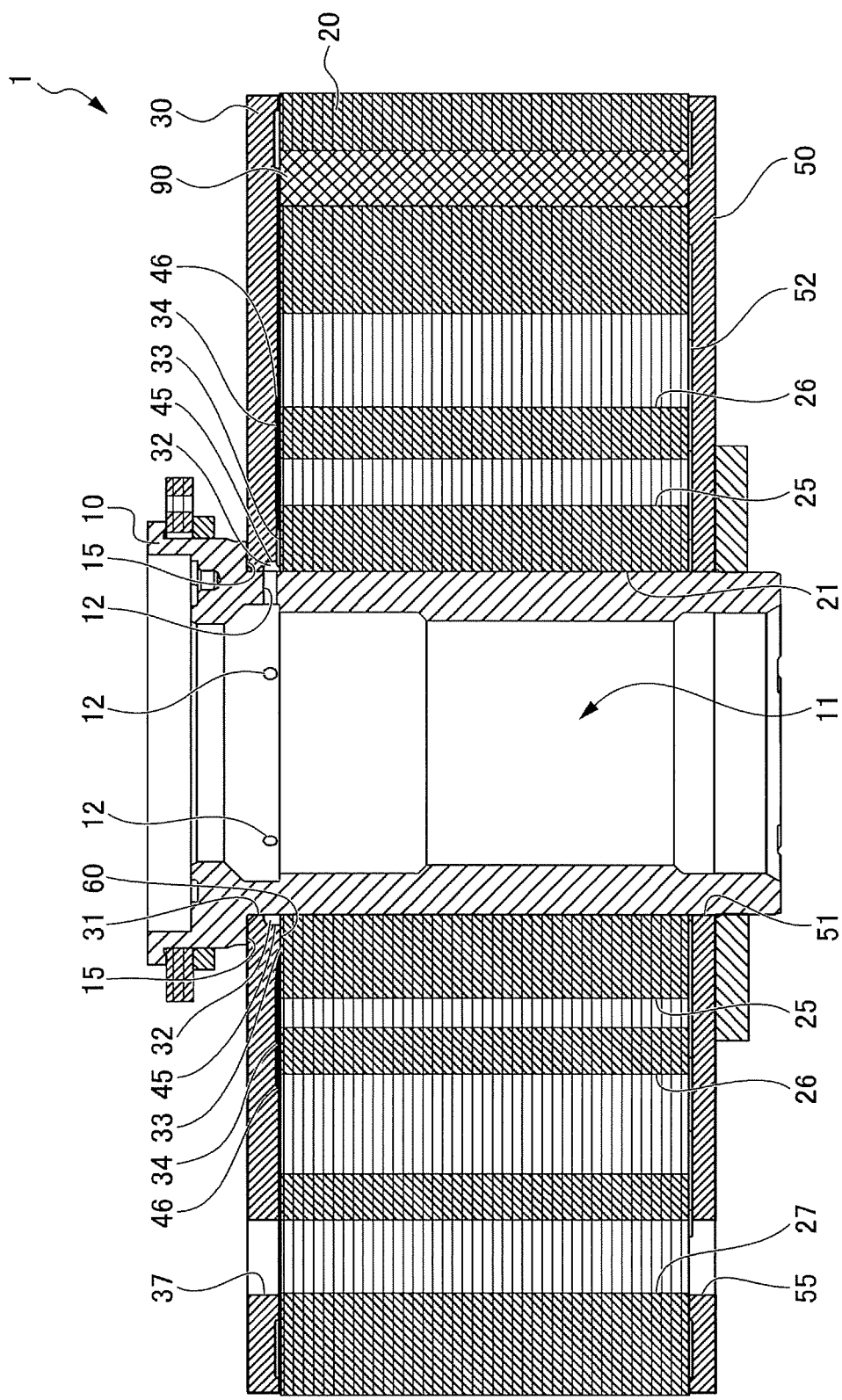
FIG. 2 is a cross-sectional view taken along the line A-A in FIG. 1.
Figure 3:
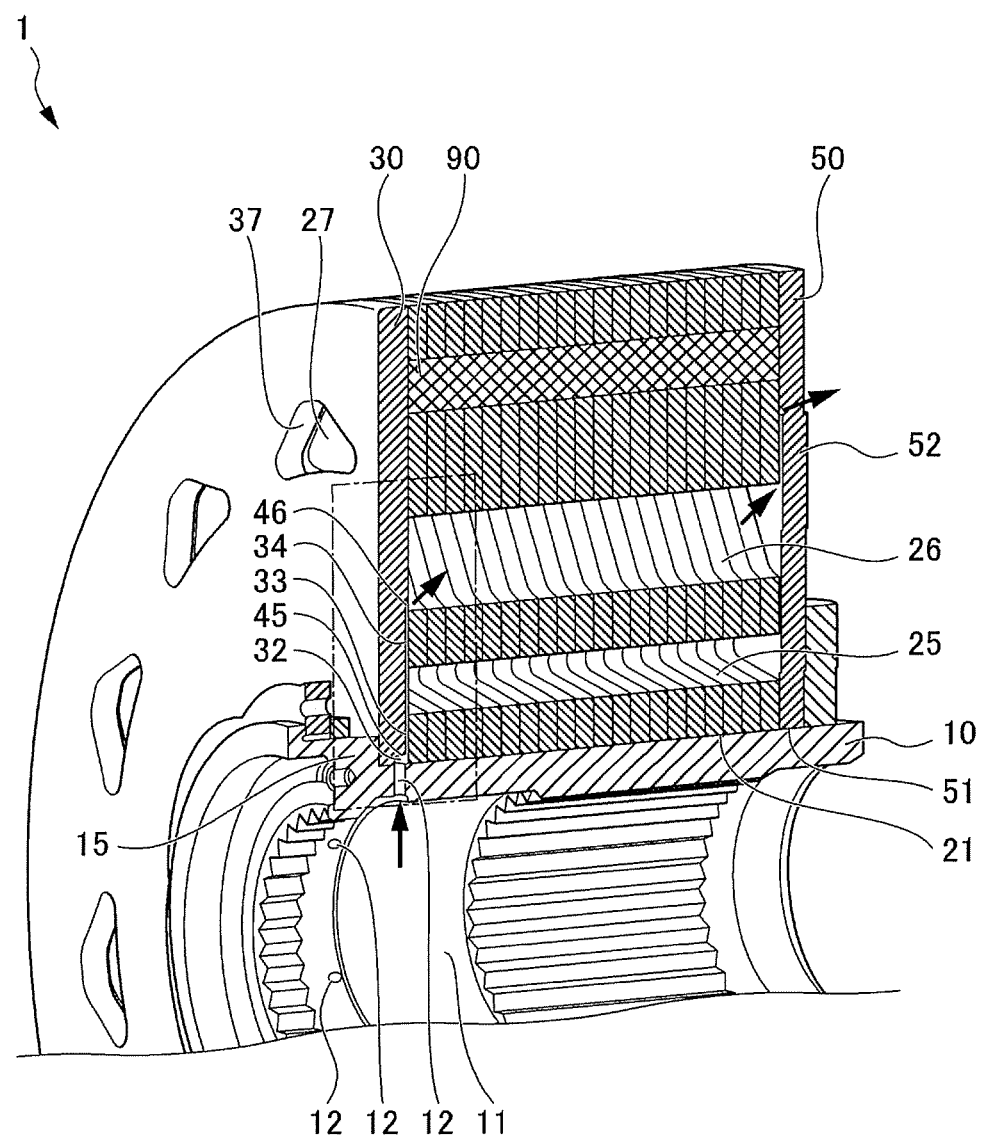
FIG. 3 is a cross-sectional perspective view showing a state of an inside of a rotor core of the present embodiment.

As a preferable embodiment of the present invention, a rotor structure of an interior permanent magnet (IPM) motor will be described below. FIG. 1 is a diagram of a rotor structure 1 of a rotary electric machine according to an embodiment of the present invention viewed from one side in an axial direction. FIG. 2 is a cross-sectional view taken along the line A-A in FIG. 1. FIG. 3 is a cross-sectional perspective view showing a state of an inside of a rotor core 20 of the present embodiment.

As shown in FIG. 1 and FIG. 2, the rotor structure 1 of the rotary electric machine of the present embodiment includes a shaft 10, the rotor core 20 pivotally supported on the shaft 10, a first end surface plate 30 arranged on one side of the rotor core 20 in the axial direction, and a second end surface plate 50 arranged on the other side of the rotor core 20 in the axial direction, as main components.

For example, the shaft 10 includes one end that is rotatably supported by a housing (not shown) through a bearing (not shown) and the other end that is rotatably supported by a transmission housing (not shown) or the like through a bearing (not shown).

Inside the shaft 10, a cooling flow path 11 through which a refrigerant flows is formed. The cooling flow path 11 extends inside the shaft 10 in the axial direction and a refrigerant can be supplied thereinto from the outside. As the refrigerant, for example, automatic transmission fluid (ATF) is used. A supply path is formed so that the ATF circulates in a transmission case (not shown) and a motor housing (not shown).

A refrigerant supply hole portion 12 is formed in an inner circumferential surface of the shaft 10 so that a refrigerant is sent from the cooling flow path 11 to the rotor core 20.

In addition, the shaft 10 includes a support 15 that supports a circumference of an insertion hole 31 on an axial outside surface of the first end surface plate 30 at an axial end thereof. The support 15 is formed in a flange shape and is in face-to-face contact with the first end surface plate 30 in the axial direction.

The rotor core 20 is formed in a cylindrical shape in which a rotor insertion hole 21 penetrating in the axial direction is formed in the center. The shaft 10 is press-fitted and fixed to the rotor insertion hole 21.

In the rotor core 20, a plurality of magnets 90 are unevenly arranged on the outer peripheral side. The plurality of magnets 90 are arranged at equal intervals in the circumferential direction in an outer circumferential portion of the rotor core 20. The magnet 90 is a permanent magnet, for example, a neodymium magnet, and magnetic pole portions in which an N pole and an S pole are arranged at a predetermined pitch is formed. In the present embodiment, twelve magnets 90 are arranged, and the number of pole pairs is 6.

In the rotor core 20, a plurality of first through holes 25 and second through holes 26 penetrating in the axial direction are formed. The first through holes 25 are formed in an inner circumferential portion of the rotor core 20. The second through holes 26 are formed between the outer circumferential portion and the first through holes 25.

In addition, in the rotor core 20, a lightening hole 27 penetrating in the axial direction is formed. The lightening hole 27 communicates with a lightening hole 37 of the first end surface plate 30 to be described below and communicates with a lightening hole 55 of the second end surface plate 50.

The rotor core 20 of the present embodiment is formed by laminating a plurality of electromagnetic steel sheets in the axial direction. For example, a disk-shaped rotor core plate having holes that will become the rotor insertion hole 21, the first through hole 25, the second through hole 26, and the lightening hole 27 during lamination according to press processing is punched and laminated, a bonding process such as caulking and adhesion is performed, and the rotor core 20 is produced.

The first end surface plate 30 is arranged to face one end surface of the rotor core 20 in the axial direction and the insertion hole 31 into which the shaft 10 is inserted is formed at the center. The lightening holes 37 are formed at equal intervals in the circumferential direction radially outside from the insertion hole 31.

Figure 4:
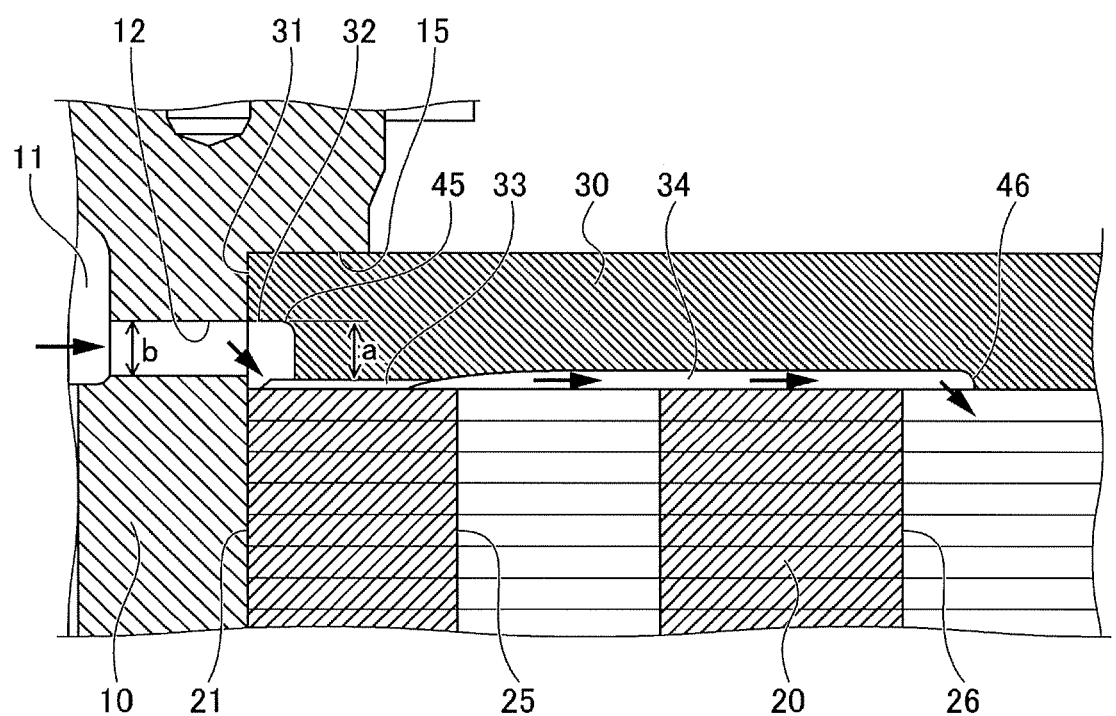
FIG. 4 is a cross-sectional view showing a state when a refrigerant is sent into a rotor core of the present embodiment.
Figure 5:
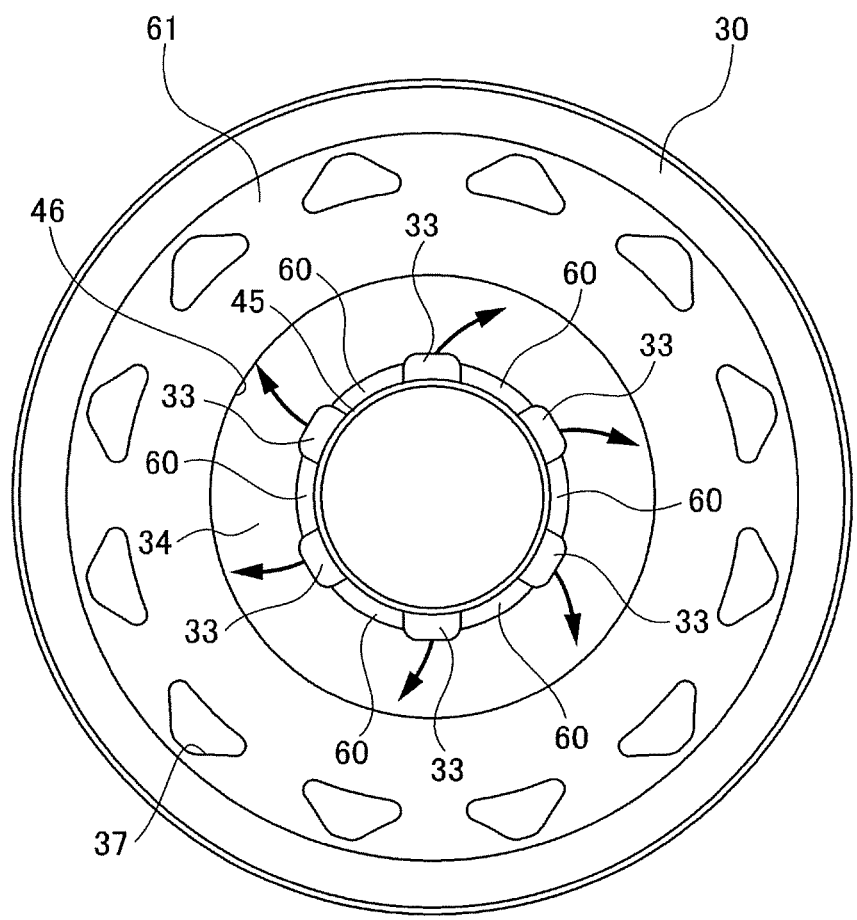
FIG. 5 is a diagram showing a surface of a first end surface plate on a rotor core side in the axial direction.
Figure 6:
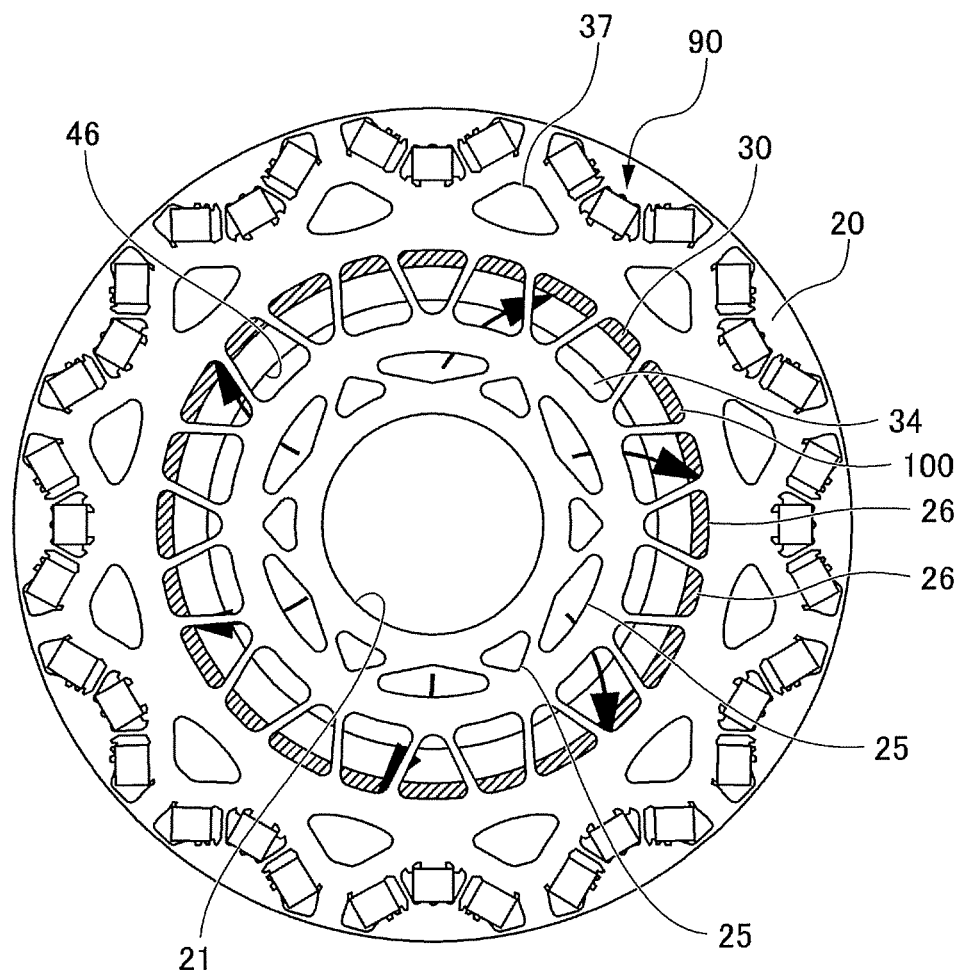
FIG. 6 is a cross-sectional view of a rotor core viewed from a second end surface plate side (outlet side).
Figure 7:
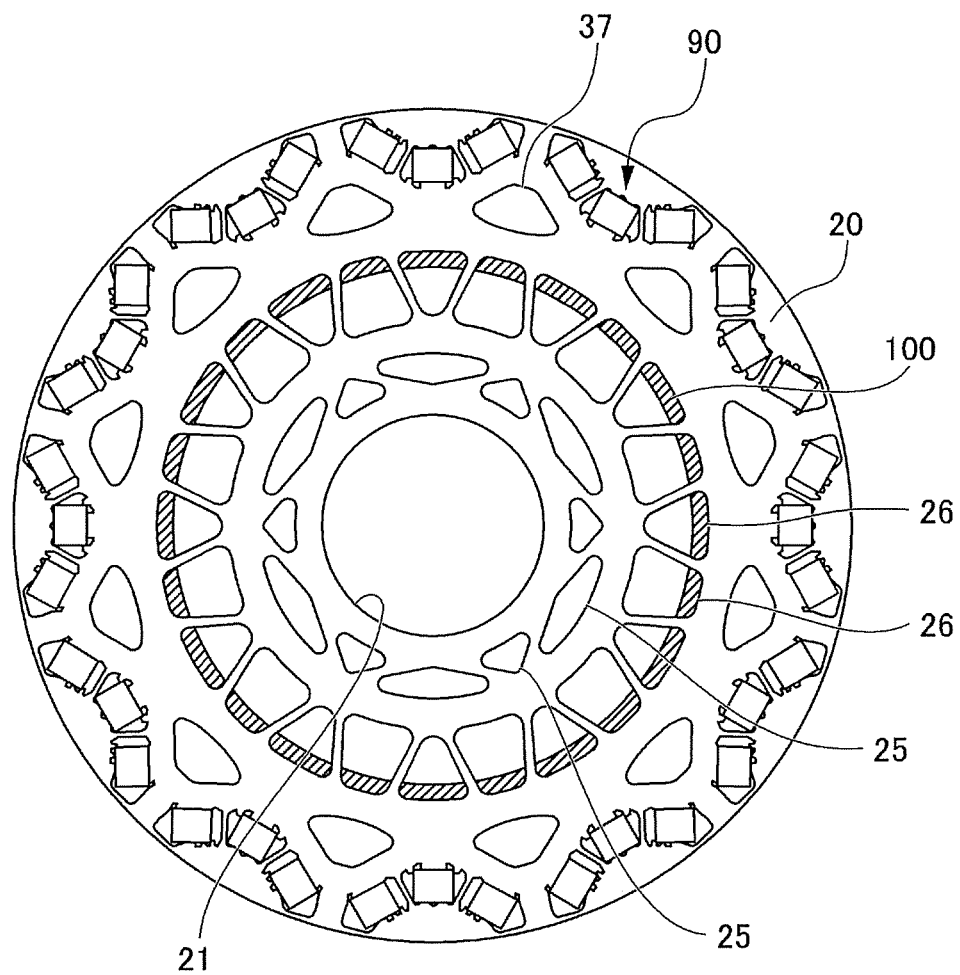
FIG. 7 is a plan view of a rotor core viewed from a first end surface plate side (supply side).

FIG. 4 is a cross-sectional view showing a state when a refrigerant is sent into the rotor core 20 of the present embodiment. FIG. 5 is a diagram showing a surface of the first end surface plate 30 on the rotor core 20 side in the axial direction. FIG. 6 is a cross-sectional view of the rotor core 20 viewed from the second end surface plate side (outlet side). FIG. 7 is a plan view of the rotor core 20 viewed from the first end surface plate 30 side (supply side). Also, FIG. 6 and FIG. 7 show states in which a refrigerant 100 is included in shaded areas.

As shown in FIG. 4 to FIG. 7, on an inner surface on the side of the rotor core 20 in the first end surface plate 30, a first annular groove 32 that extends annularly along a circumference of the insertion hole 31, a plurality of grooves 33 that extend from the first annular groove 32 in a radially outward direction, and a second annular groove 34 to which a radially outside end portion of the groove 33 is connected are formed.

The first annular groove 32 has an annular shape surrounding the shaft 10 and communicates with the refrigerant supply hole portion 12.

The groove 33 is connected to the first annular groove 32 and is connected to the second annular groove 34, and is a linear groove serving as a path through which a refrigerant is sent from the first annular groove 32 to the second annular groove 34.

The plurality of grooves 33 are arranged at equal intervals in the circumferential direction. In the present embodiment, the number of grooves 33 corresponds to the number of pole pairs of the magnets 90. The number of grooves 33 is 6, which is the same number of times (1-fold) the number of pole pairs 6 of the magnets 90, that is, a multiple.

In the present embodiment, a first step 45 is formed at a portion in which the first annular groove 32 and the groove 33 are connected. As shown in FIG. 4, depending on a depth a of the first step 45, a depth of the groove 33 decreases with respect to a depth of the first annular groove 32. In addition, the depth a of the first step 45 that is formed at the portion in which the first annular groove 32 and the groove 33 are connected is formed to be larger than a diameter b of the refrigerant supply hole portion 12.

The first annular groove 32 functions as a refrigerant reservoir. The refrigerant remaining in the first annular groove 32 is sent to the second annular groove 34 on the radially outer side through the groove 33 according to a centrifugal force generated by rotation of the rotor core 20. That is, according to the plurality of grooves 33 that are arranged at equal intervals in the circumferential direction, the refrigerant is uniformly dispersed and sent to the second annular groove 34.

A radially outside end portion of the second annular groove 34 is a part in which the second through hole 26 overlaps viewed in the axial direction. Here, a second step 46 is formed at the radially outside end portion of the second annular groove 34. A detailed configuration of the second step 46 will be described below.

The second end surface plate 50 is arranged to face the other end surface of the rotor core 20 in the axial direction, and an insertion hole 51 into which the shaft 10 is inserted is formed at the center.

Figure 8:
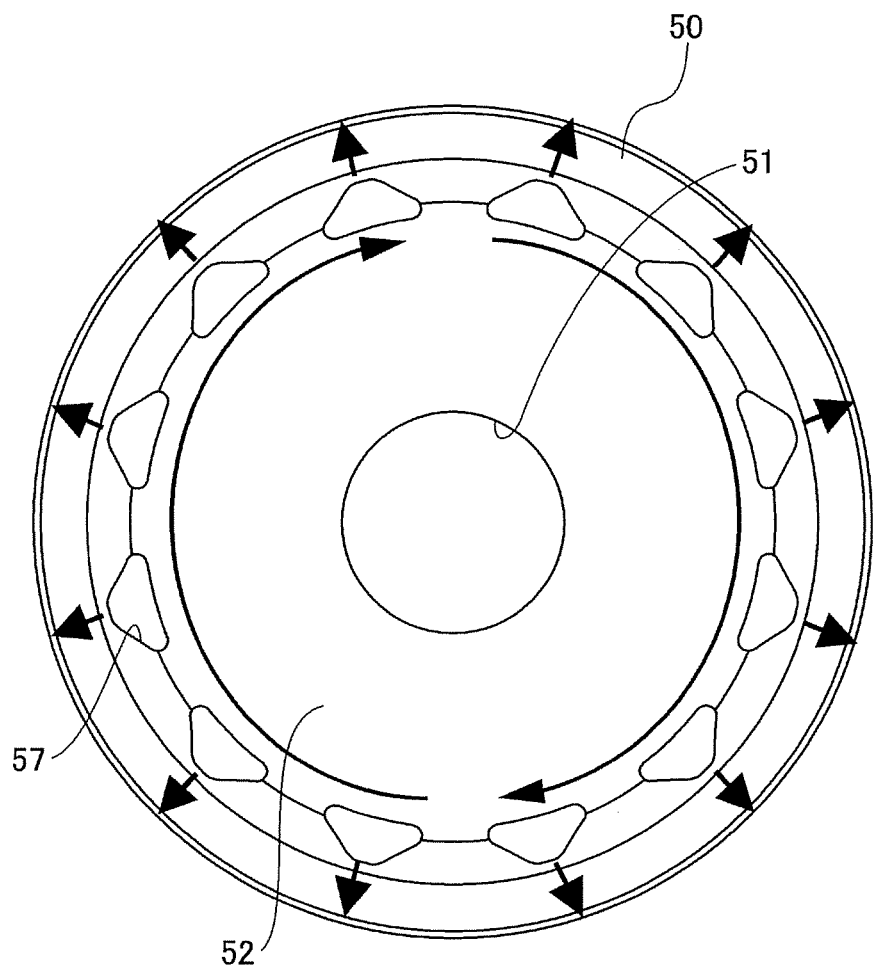
FIG. 8 is a diagram showing a surface of a second end surface plate on a rotor core side in the axial direction.

FIG. 8 is a diagram showing a surface of the second end surface plate 50 on the rotor core 20 side in the axial direction. On an inner surface on the side of the rotor core 20 in the second end surface plate 50, an outlet side annular recess 52 that communicates with the second through hole 26 of the rotor core 20 and extends annularly along a circumference of the insertion hole 51 is formed.

The outlet side annular recess 52 is larger than the first annular groove 32 and the second annular groove 34 of the first end surface plate 30. An end of an outer peripheral side of the outlet side annular recess 52 overlaps the lightening hole 55 of the second end surface plate 50. The refrigerant that has passed the second through hole 26 is sent in a radially outward direction by a centrifugal force in the outlet side annular recess 52, and is discharged to the outside of the rotor core 20 through the lightening hole 55 of the second end surface plate 50 and the like.

Figure 9:
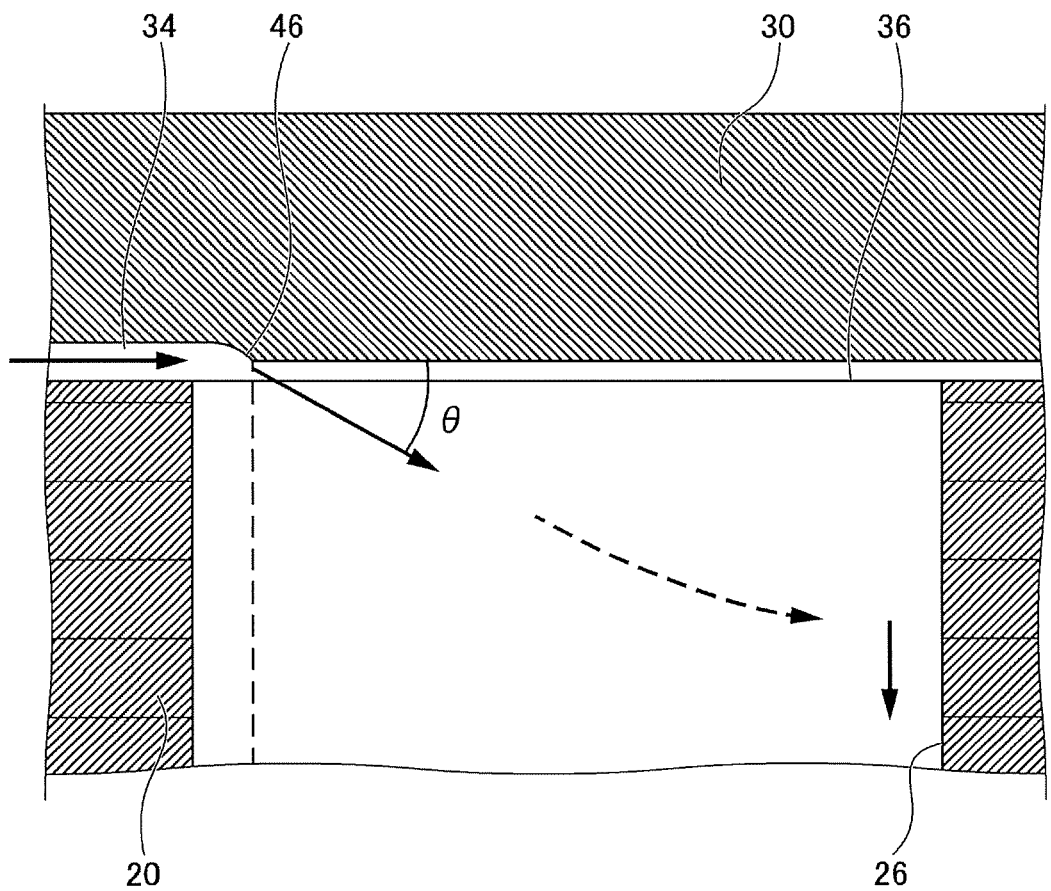
FIG. 9 is a cross-sectional view schematically showing a state when a refrigerant is sent to a second end surface plate side in the axial direction by an inclined surface or a curved surface of a second step.
Figure 10:
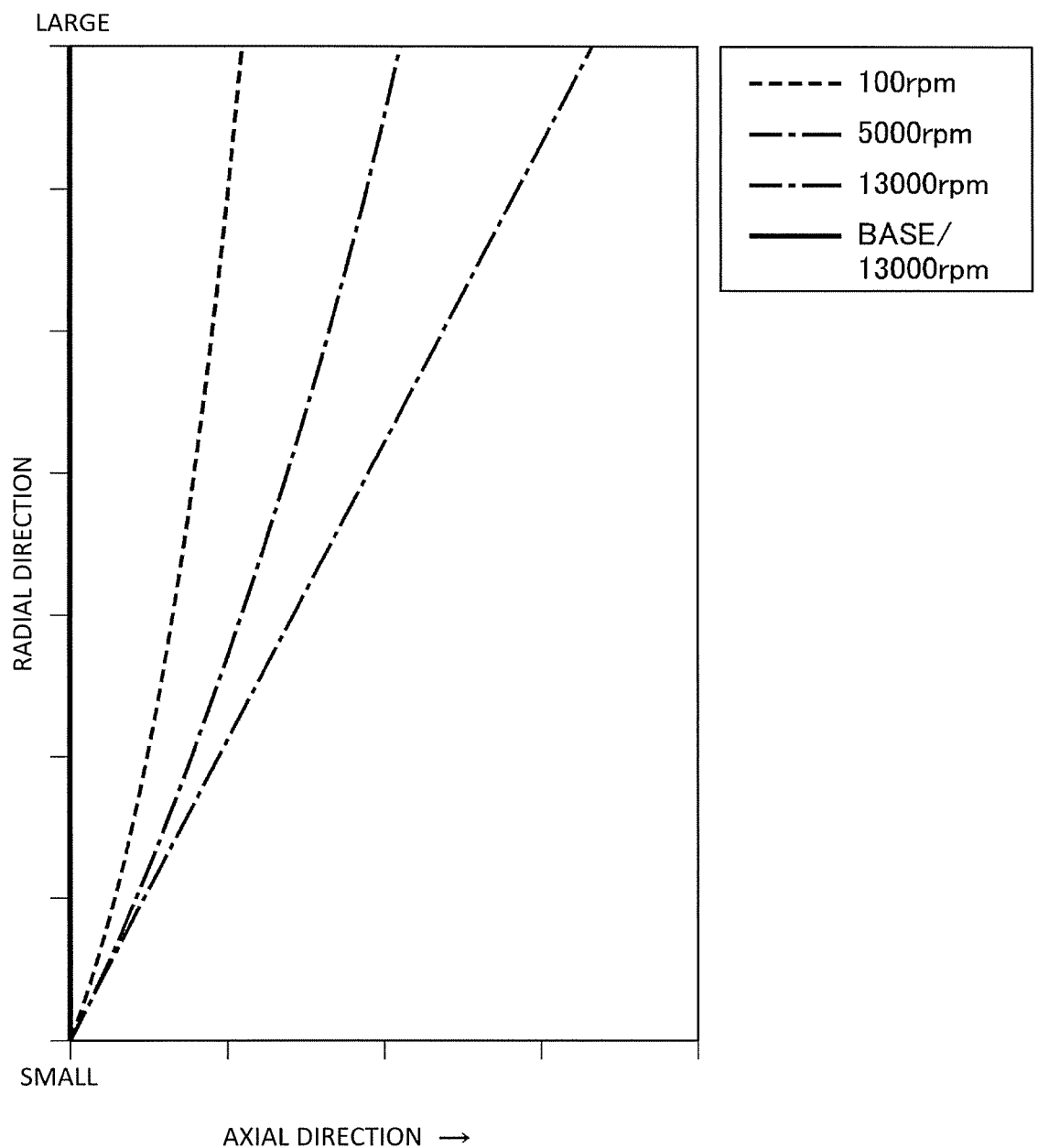
FIG. 10 is a graph showing a flying distance of a refrigerant in the axial direction according to difference in the rotational speed.

Next, a detailed configuration of the second step 46 will be described with reference to FIG. 9 and FIG. 10. FIG. 9 is a cross-sectional view schematically showing a state when a refrigerant is sent to the second end surface plate 50 side in the axial direction by an inclined surface or a curved surface of the second step 46. FIG. 10 is a graph showing a flying distance of a refrigerant in the axial direction according to difference in the rotational speed.

As shown in FIG. 9, the second step 46 of the present embodiment is formed as an inclined surface or a curved surface to be positioned in a radially outward direction toward the rotor core 20. In other words, the second step 46 is formed as an inclined surface or a curved surface that becomes closer to the second through hole 26 (the rotor core 20) as a surface facing the inside in the radial direction approaches the outside in the radial direction. In addition, in a radially outward direction from the second step 46, a gap 36 is forming between the first end surface plate 30 and an end surface of the rotor core 20.

The refrigerant that has reached the second step 46 due to a centrifugal force is guided to the second through hole 26 side by an inclined surface or a curved surface thereof, and is blown to the second end surface plate 50 side in the axial direction.

Here, a case in which the second step is a right angle step, that is, a surface facing the inside in the radial direction of the second step becomes a surface (right angle step) in the axial direction may be conceived. In the right angle step, even if a refrigerant that flows from the inside to the outside in the radial direction passes over the second step, it is not guided to the second through hole 26 side, but is directly conveyed in a radially outward direction through the gap 36. When an amount leaking to the outside from the gap between the rotor core 20 and the first end surface plate 30 without passing the second through hole 26 increases, cooling efficiency of the rotor core 20 may decrease. In this regard, in the configuration shown in FIG. 9, since the refrigerant can fly to the second end surface plate 50 side in the axial direction due to an inclined surface or a curved surface of the second step 46, it is possible to prevent cooling efficiency inside the rotor core 20 from decreasing.

In the graph of FIG. 10, the radial direction indicates a dimension from the center of the rotor core 20 to the outside and indicates moving further away from the center of the rotor core 20 as the size in the radial direction increases. In addition, an arrow in the axial direction indicates a direction from the first end surface plate 30 side to the second end surface plate 50 side.

According to the graph, it can be understood that, even if a rotational speed (rpm) is changed between 100 and 13000, it is possible to send a refrigerant to the second end surface plate 50 side in the axial direction of the second through hole 26. In particular, a trend is shown in which a more refrigerant is sent to the second end surface plate 50 in the axial direction when a rotational speed is higher.

Based on the results of the graph in FIG. 10, a surface facing the inside in the radial direction of the second step 46 is formed as an inclined surface or a curved surface. Therefore, it is possible to efficiently send the refrigerant to the second end surface plate 50 side in the axial direction.

Next, a structure by which the rotor core 20 is supported by the shaft 10 will be described. As shown in FIG. 5, the first end surface plate 30 includes an inner contact surface portion 60 and an outer contact surface portion 61 in contact with an end surface of the rotor core 20 on an inner surface on the side of the rotor core 20. The inner contact surface portion 60 is an area between the first annular groove 32 and the second annular groove 34 and is a part between the plurality of grooves 33 in the circumferential direction. The inner contact surface portion 60 is in contact with a radially inside end portion on an axial end surface of the rotor core 20. On the other hand, the outer contact surface portion 61 is an area radially outside the second annular groove 34, and is an outer circumferential portion of the first end surface plate 30. The outer contact surface portion 61 is in contact with a radially outside end portion on an axial end surface of the rotor core 20.

Figure 11:
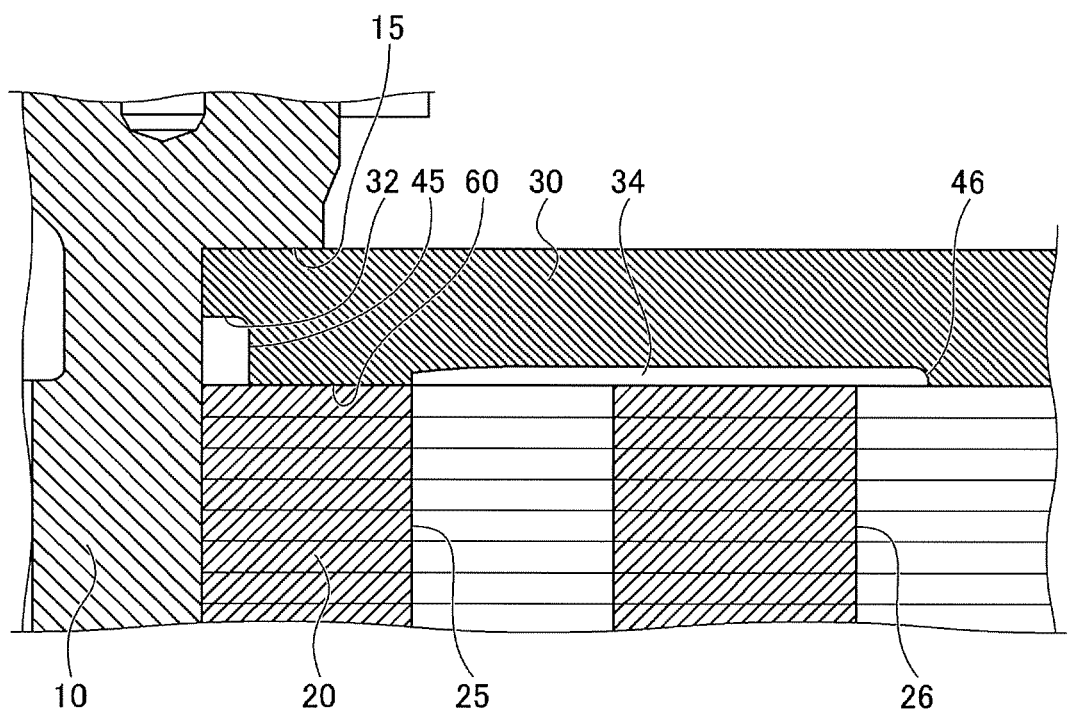
FIG. 11 is a cross-sectional view showing a first end surface plate of a shaft and a support structure of a rotor core.

FIG. 11 is a cross-sectional view showing a support structure of the shaft 10 for the first end surface plate 30 and the rotor core 20. As shown in FIG. 11, in the present embodiment, while the support 15 of the shaft 10 supports the inner contact surface portion 60 of the first end surface plate 30, the rotor core 20 is press-fitted and fixed to the shaft 10. While the first end surface plate 30 is reliably supported by the support 15 formed in a flange shape on the shaft 10, a press-fitting operation of the rotor core 20 can be performed.

The following effects are obtained in the rotor structure 1 of the rotary electric machine of the present embodiment.

In the present embodiment, the plurality of grooves 33 that radially extend are provided on a surface on the rotor core side of the first end surface plate 30, and the first annular groove 32 that extends annularly is provided along a circumference of the insertion hole 31 into which the shaft 10 is inserted. In addition, the first annular groove 32 is connected to a radially inside end portion of the groove 33 and the refrigerant supply hole portion 12 of the rotor core 20, and a depth of the first annular groove 32 is set to be larger than a depth of the groove 33.

Accordingly, since the refrigerant supply hole portion 12 is connected to the first annular groove 32 having an annular shape, even if positional deviation occurs in the circumferential direction due to variation in assembling accuracy and processing accuracy during production, a connection state of both is favorably maintained. As a result, it is possible to reduce variation in a supply amount of refrigerant and it is possible to improve cooling performance. In addition, when a depth of the first annular groove 32 is set to be larger, since the first annular groove 32 can function as a refrigerant reservoir, it is possible to further reduce variation in a supply amount of a refrigerant and it is possible to further improve cooling performance.

In addition, in the present embodiment, a depth a of the first step 45 formed in a portion in which the first annular groove 32 and the groove 33 are connected is set to be larger than a diameter b of the refrigerant supply hole portion 12. Accordingly, since it is possible to efficiently supply a refrigerant to the rotor core 20 while friction when the refrigerant flows is reduced, it is possible to further improve cooling performance.

In addition, in the present embodiment, the grooves 33 corresponding to a multiple of the number of pole pairs of the rotary electric machine are formed. Accordingly, since a refrigerant can be uniformly supplied to a magnet portion formed of the plurality of magnets 90 of the rotor core 20 in which the magnets 90 are held, it is possible to further improve cooling performance.

In addition, in the present embodiment, the second annular groove 34 connected to the radially outside end portion of the groove 33 is provided, and a radial position of the second step 46 formed at the radially outside end portion of the second annular groove 34 overlaps a radial position of the second through hole 26 of the rotor core 20. Accordingly, since it is possible to efficiently and reliably supply a refrigerant to the second through hole 26 of the rotor core 20, it is possible to efficiently cool the rotor core 20 and it is possible to improve cooling performance.

In addition, in the present embodiment, the second step 46 at the radially outside end portion of the second annular groove 34 is formed as a curved surface or an inclined surface that is positioned in a radially outward direction toward the rotor core 20. Accordingly, it is possible to more reliably prevent a refrigerant from flowing from a gap between the first end surface plate 30 and the rotor core 20 in a radially outward direction while friction is reduced. That is, since it is possible to efficiently and reliably supply a refrigerant into the second through hole 26 of the rotor core 20, it is possible to further improve cooling performance.

In addition, in the present embodiment, the support 15 that supports a circumference of the insertion hole 31 on the axial outside surface of the first end surface plate 30 is provided in a flange of the shaft 10 and the inner contact surface portion 60 in contact with a radially inside end portion on the axial end surface of the rotor core 20 is provided on the first end surface plate 30. Accordingly, since the first end surface plate 30 can be supported while being sandwiched in the axial direction, it is possible to prevent deformation of the first end surface plate 30 when the rotor core 20 is press-fitted.

In addition, in the present embodiment, the plurality of second through holes 26 formed in the rotor core 20 are arranged at equal intervals in the circumferential direction. Accordingly, since a refrigerant can be uniformly supplied to the rotor core 20, it is possible to further improve cooling performance.

In addition, it is possible to understand the following technical ideas from the above embodiment.

A rotor structure of a rotary electric machine includes a rotating shaft portion including a refrigerant flow path through which a refrigerant flows; a cylindrical rotor core that is pivotally supported on the rotating shaft portion and holds a plurality of magnets; and an end surface plate which is arranged to face an axial end surface of the rotor core and in which an insertion hole into which the rotating shaft portion is inserted is formed.

The rotating shaft portion includes a refrigerant supply hole portion through which a refrigerant is supplied between the rotor core and the end surface plate from the refrigerant flow path.

The rotor core includes a plurality of through holes that are formed in a circumferential direction radially inside from the magnets and extend in an axial direction to pass through.

The end surface plate includes flowing grooves that are formed on an inner surface on the side of the rotor core and connected to the refrigerant supply hole portion.

On a radially outside end portion of the flowing groove, a step is formed as a curved surface or an inclined surface that is positioned in a radially outward direction toward the rotor core.

A radial position of the step is arranged between a radially outside end and a radially inside end of the through hole.

Accordingly, it is possible to reduce friction and it is possible to effectively prevent a refrigerant from flowing to the outside without passing the second through hole 26.

While the preferable embodiment of the present invention has been described above, the present invention is not limited to the above-described embodiment, and can be appropriately modified. While a motor has been exemplified as the rotary electric machine in the above embodiment, the rotary electric machine is not limited thereto. For example, as the rotary electric machine, the same configuration as in the above embodiment can be applied to a rotor structure of a power generator.

What is claimed is:

1. A rotor structure of a rotary electric machine comprising:
    a rotating shaft portion including a refrigerant flow path through which a refrigerant flows;
    a cylindrical rotor core that is pivotally supported on the rotating shaft portion and holds a plurality of magnets; and
    an end surface plate which is arranged to face an axial end surface of the rotor core and in which an insertion hole into which the rotating shaft portion is inserted is formed,
    wherein the rotating shaft portion includes a refrigerant supply hole portion through which a refrigerant is supplied between the rotor core and the end surface plate from the refrigerant flow path, and
    wherein the end surface plate includes
    a plurality of grooves that are formed on an inner surface on a side of the rotor core, and
    a first annular groove which is formed to annularly extend in a circumference of the insertion hole on an inner surface on the side of the rotor core and is connected between each of the plurality of grooves and the refrigerant supply hole portion, and which has a larger depth than each of the plurality of grooves,
    wherein a depth of a first step formed at a portion in which the first annular groove and the groove are connected is greater than a diameter of the refrigerant supply hole portion.

2. The rotor structure of a rotary electric machine according to claim 1,
    wherein a plurality of grooves corresponding to a multiple of the number of pole pairs of the rotary electric machine are formed.

3. The rotor structure of a rotary electric machine according to claim 1,
    wherein the rotor core includes a plurality of through holes that are formed in a circumferential direction radially inside from the magnets and extend in an axial direction to pass through,
    wherein the end surface plate includes a second annular groove which is formed to annularly extend radially outside from the groove on an inner surface on the side of the rotor core and is connected to a radially outside end portion of the groove, and
    wherein a radial position of a second step formed at a radially outside end portion of the second annular groove is arranged between a radially outside end portion and a radially inside end portion of the through hole.

4. The rotor structure of a rotary electric machine according to claim 3,
    wherein the second step is formed as a curved surface or an inclined surface that is positioned in a radially outward direction toward the rotor core.

5. The rotor structure of a rotary electric machine according to claim 3,
    wherein the rotating shaft portion includes a support that is formed in a flange shape at an axial end thereof and supports a circumference of the insertion hole on an axial outside surface of the end surface plate, and
    wherein the end surface plate includes a contact surface portion which is formed between the plurality of grooves that are arranged between the first annular groove and the second annular groove in the circumferential direction and which is in contact with a radially inside end portion on the axial end surface of the rotor core.

6. The rotor structure of a rotary electric machine according to claims 1,
wherein the plurality of through holes are arranged at equal intervals in a circumferential direction.

7. The rotor structure of a rotary electric machine according to claim 2,
wherein the rotor core includes a plurality of through holes that are formed in a circumferential direction radially inside from the magnets and extend in an axial direction to pass through,
wherein the end surface plate includes a second annular groove which is formed to annularly extend radially outside from the groove on an inner surface on the side of the rotor core and is connected to a radially outside end portion of the groove, and
wherein a radial position of a second step formed at a radially outside end portion of the second annular groove is arranged between a radially outside end portion and a radially inside end portion of the through hole.

8. The rotor structure of a rotary electric machine according to claim 4,
wherein the rotating shaft portion includes a support that is foil ied in a flange shape at an axial end thereof and supports a circumference of the insertion hole on an axial outside surface of the end surface plate, and
wherein the end surface plate includes a contact surface portion which is formed between the plurality of grooves that are arranged between the first annular groove and the second annular groove in the circumferential direction and which is in contact with a radially inside end portion on the axial end surface of the rotor core.

9. The rotor structure of a rotary electric machine according to claim 2,
wherein the plurality of through holes are arranged at equal intervals in a circumferential direction.

10. The rotor structure of a rotary electric machine according to claim 3,
wherein the plurality of through holes are arranged at equal intervals in the circumferential direction.

11. The rotor structure of a rotary electric machine according to claim 4,
wherein the plurality of through holes are arranged at equal intervals in the circumferential direction.

12. The rotor structure of a rotary electric machine according to claim 5,
wherein the plurality of through holes are arranged at equal intervals in the circumferential direction.

13. The rotor structure of a rotary electric machine according to claim 7,
wherein the rotating shaft portion includes a support that is formed in a flange shape at an axial end thereof and supports a circumference of the insertion hole on an axial outside surface of the end surface plate, and
wherein the end surface plate includes a contact surface portion which is formed between the plurality of grooves that are arranged between the first annular groove and the second annular groove in the circumferential direction and which is in contact with a radially inside end portion on the axial end surface of the rotor core.

* * * * *